(12) United States Patent
Chandramouli et al.

(10) Patent No.: US 10,692,016 B2
(45) Date of Patent: Jun. 23, 2020

(54) CLASSIFYING UNSTRUCTURED COMPUTER TEXT FOR COMPLAINT-SPECIFIC INTERACTIONS USING RULES-BASED AND MACHINE LEARNING MODELING

(71) Applicant: FMR LLC, Boston, MA (US)

(72) Inventors: Aravind Chandramouli, Bangalore (IN); Nitin Hardeniya, Bangalore (IN); Sunil Kumar, Bangalore (IN)

(73) Assignee: FMR LLC, Boston, MA (US)

( * ) Notice: Subject to any disclaimer, the term of this patent is extended or adjusted under 35 U.S.C. 154(b) by 733 days.

(21) Appl. No.: 15/426,959

(22) Filed: Feb. 7, 2017

(65) Prior Publication Data

US 2018/0225591 A1 Aug. 9, 2018

(51) Int. Cl.
G06N 20/00 (2019.01)
G06F 16/35 (2019.01)
G06N 5/02 (2006.01)

(52) U.S. Cl.
CPC ............. G06N 20/00 (2019.01); G06F 16/35 (2019.01); G06N 5/025 (2013.01)

(58) Field of Classification Search
CPC ...................................................... G06N 20/00
USPC ........................................................... 706/12
See application file for complete search history.

(56) References Cited

U.S. PATENT DOCUMENTS

| | | | |
|---|---|---|---|
| 7,725,414 B2 | 5/2010 | Nigam et al. | |
| 8,473,510 B1 | 6/2013 | Tong et al. | |
| 8,533,208 B2 | 9/2013 | Sundaresan et al. | |
| 8,676,730 B2 | 3/2014 | Ghani et al. | |
| 8,818,788 B1 | 8/2014 | Mihalik et al. | |
| 8,856,119 B2 | 10/2014 | Bhagwan et al. | |
| 9,037,464 B1 * | 5/2015 | Mikolov | G06F 40/30 704/255 |
| 9,043,197 B1 | 5/2015 | Pasca et al. | |
| 10,373,067 B1 * | 8/2019 | Chen | G06F 16/353 |
| 2006/0200342 A1 | 9/2006 | Corston-Oliver et al. | |
| 2007/0294199 A1 | 12/2007 | Nelken et al. | |
| 2008/0091423 A1 | 4/2008 | Roy et al. | |

(Continued)

OTHER PUBLICATIONS

Silva et al., "The Importance of Stop Word Removal on Recall Values in Text Categorization", 2003, IEEE. (Year: 2003).*

(Continued)

*Primary Examiner* — Hien D Khuu
(74) *Attorney, Agent, or Firm* — Proskauer Rose LLP

(57) ABSTRACT

Methods and apparatuses are described for analyzing unstructured computer text for identification and classification of complaint-specific interactions. A computer data stores unstructured text. A server computing device splits the unstructured text into phrases of words. The server generates a set of tokens from each phrase and removes tokens that are stopwords. The server generates a normalized sentiment score for each set of tokens. The server uses a rules-based classification engine to generate a rules-based complaint score for each set of tokens. The server uses an artificial intelligence machine learning model to generate a model-based complaint score for each set of tokens. The server determines determine whether each set of tokens corresponds to a complaint-specific interaction based upon the rules-based complaint score and the model-based complaint score.

17 Claims, 3 Drawing Sheets

(56) References Cited

U.S. PATENT DOCUMENTS

| | | | |
|---|---|---|---|
| 2013/0268260 A1* | 10/2013 | Lundberg | G06F 16/90332 |
| | | | 704/8 |
| 2014/0229408 A1* | 8/2014 | Vijayaraghavan | G06N 5/025 |
| | | | 706/12 |
| 2016/0042359 A1* | 2/2016 | Singh | G06F 40/58 |
| | | | 704/2 |
| 2018/0053235 A1* | 2/2018 | Catalano | G06Q 30/0201 |

OTHER PUBLICATIONS

Kim et al., "An Unsupervised Approach to Domain-Specific Term Extraction," Proceedings of the Australasian Language Technology Association Workshop 2009, University of New South Wales, Sydney, Australia, Dec. 3-4, 2009, pp. 94-98.

Saif, Hassan; Fernez, Miriam and Alani, Harith (2014). Automatic stopword generation using contextual semantics for sentiment analysis of Twitter. In: Proceedings of the ISWC 2014 Posters & Demonstrations Track.

Parisi-Baradad, Vincenc and Alexis-Michel Mugabushaka, "Corpus Specific Stop Words to Improve the Textual Analysis in Scientometrics," ISSI, Bogazici University Printhouse, 2015, 7 pages.

\* cited by examiner

CLASSIFYING UNSTRUCTURED COMPUTER TEXT FOR COMPLAINT-SPECIFIC INTERACTIONS USING RULES-BASED AND MACHINE LEARNING MODELING

TECHNICAL FIELD

This application relates generally to methods and apparatuses, including computer program products, for classifying unstructured computer text for complaint-specific interactions using rules-based and machine learning modeling.

BACKGROUND

With the advent of computer-based communications, the concept of text can mean many different things, such as online surveys, feedback forms, chat dialog, social media interactions and conversations, and so forth. These types of unstructured computer text are present across all business domains in a variety of forms. Manual interpretation of such unstructured text to glean useful, business-actionable information is inefficient and time-consuming.

Recently, computing systems and related technical resources have been applied to interpret the unstructured computer text in order to understand underlying context, themes and sentiment the text. In one example, data mining and text processing applications have been used to, e.g., extract sentiment from unstructured computing text in order to determine items such as customeremotions and preferences. However, such computerized techniques are generally inaccurate because they are limited to a high-level review of unstructured text. For example, computer platforms previously existed that automated the complaint registration process—such as the systems and methods for automating slamming and cramming complaints described in U.S. Pat. No. 6,853,722 to Joseph et al. where the system identifies the customer calling in using, e.g., a calling telephone number and then analyzes recent telephone activity to extrapolate the type of complaint that the customer might want to register. There, the system looks at only two basic types of complaints, a slam or a cram—without using advanced computing techniques to analyze the underlying computer text semantically to classify more specific types of complaints.

SUMMARY

Therefore, methods and systems are needed to conduct automated analysis of unstructured computer text in real time to identify and classify complaint-specific interactions within the corpus of text. The techniques described herein leverage highly-advanced artificial intelligence computing techniques to analyze unstructured computer text for the purposes of:

Identifying and tagging complaints present in the text;
Identifying and tagging tonality of the complaints;
Profiling respondents to understand aspects of the respondents that have provided positive and/or negative feedback on a particular theme;
Using the tagged text as quantitative data in statistical analysis; and
Generating a robust graphical user interface to assist with effective interpretation of the tagged text.

The present methods, systems, and techniques can be advantageously implemented in a variety of real-world applications, including but not limited to Unstructured, domain-specific computer text captured as a part of human resources applications such as employee engagement surveys, employee exit interviews, training feedback forms, and manager feedback forms;

Unstructured, domain-specific computer text captured as a part of customer-facing applications, such as customer feedback forms, customer interactions such as emails, phone logs, customer call center records, attitudinal data, and customer relationship management data; and Unstructured, domain-specific computer text captured as a part of social media applications, such as blog posts, chat logs, Facebook™ profiles and posts, Twitter™ posts, and so forth.

The invention, in one aspect, features a system used in a computing environment in which unstructured computer text is analyzed for identification and classification of complaint-specific interactions. The system comprises a computer data store including unstructured text, the unstructured text being input via a web page, input directly into the computer data store via a first computer file, or any combination thereof. The system comprises a server computing device in communication with the computer data store. The server computing device is programmed to split the unstructured text into one or more phrases, each phrase comprising a plurality of words. The server computing device is programmed to generate a set of tokens from each phrase, where each token comprises a word. The server computing device is programmed to identify one or more tokens in each set of tokens that are stopwords and remove the stopwords from the set of tokens. The server computing device is programmed to determine, for each set of tokens, a number of tokens in the set of tokens. The server computing device is programmed to determine, for each set of tokens, a sentiment score for each token in the set of tokens. The server computing device is programmed to identify, for each set of tokens, one or more tokens in the set of tokens as competitor name tokens. The server computing device is programmed to identify, for each set of tokens, one or more tokens in the set of tokens as complaint tokens based upon the sentiment score for that token. The server computing device is programmed to generate, for each set of tokens, a normalized sentiment score for the set of tokens based upon the sentiment score for each token in the set. The server computing device is programmed to generate, for each set of tokens using a rules-based classification engine executing on the server computing device, a rules-based complaint score for the set of tokens based upon the a) number of tokens in the set of tokens, b) the identified competitor names in the set of tokens, and c) the identified complaint tokens in the set of tokens. The server computing device is programmed to generate, for each set of tokens using an artificial intelligence machine learning model executing on the server computing device, a model-based complaint score for the set of tokens, the artificial intelligence machine learning model generated by the server computing device by creating a word vector for each token from the unstructured text and inserting the word vector in a high-dimensional space, where a position of each word vector in the high-dimensional space is based upon a semantic relationship between the corresponding token and surrounding tokens in the unstructured text. The server computing device is programmed to determine, for each set of tokens, whether the set of tokens corresponds to a complaint-specific interaction based upon the rules-based complaint score and the model-based complaint score.

The invention, in another aspect, features a computerized method in which unstructured computer text is analyzed for identification and classification of complaint-specific interactions. The method comprises storing, in a computer data store, unstructured text, the unstructured text being input via a web page, input directly into the computer data store via a first computer file, or any combination thereof. The method comprises splitting, by a server computing device in communication with the computer data store, the unstructured text into one or more phrases, each phrase comprising a plurality of words. The method comprises generating, by the server computing device, a set of tokens from each phrase, where each token comprises a word. The method comprises identifying, by the server computing device, one or more tokens in each set of tokens that are stopwords and remove the stopwords from the set of tokens. The method comprises determining, by the server computing device for each set of tokens, a number of tokens in the set of tokens. The method comprises determining, by the server computing device for each set of tokens, a sentiment score for each token in the set of tokens. The method comprises identifying, by the server computing device for each set of tokens, one or more tokens in the set of tokens as competitor name tokens. The method comprises identifying, by the server computing device for each set of tokens, one or more tokens in the set of tokens as complaint tokens based upon the sentiment score for that token. The method comprises generating, by the server computing device for each set of tokens, a normalized sentiment score for the set of tokens based upon the sentiment score for each token in the set. The method comprises generating, for each set of tokens using a rules-based classification engine executing on the server computing device, a rules-based complaint score for the set of tokens based upon the a) number of tokens in the set of tokens, b) the identified competitor names in the set of tokens, and c) the identified complaint tokens in the set of tokens. The method comprises generating, for each set of tokens using an artificial intelligence machine learning model executing on the server computing device, a model-based complaint score for the set of tokens, the artificial intelligence machine learning model generated by the server computing device by creating a word vector for each token from the unstructured text and inserting the word vector in a high-dimensional space, where a position of each word vector in the high-dimensional space is based upon a semantic relationship between the corresponding token and surrounding tokens in the unstructured text. The method comprises determining, by the server computing device for each set of tokens, whether the set of tokens corresponds to a complaint-specific interaction based upon the rules-based complaint score and the model-based complaint score.

The invention, in another aspect, features a computer readable storage medium comprising programmatic instructions for operation of a computing environment in which unstructured computer text is analyzed for identification and classification of complaint-specific interactions. The instructions are operable to cause a computer data store to store unstructured text, the unstructured text being input via a web page, input directly into the computer data store via a first computer file, or any combination thereof. The instructions are operable to cause a server computing device in communication with the computer data store, and including an rules-based classification engine and an artificial intelligence machine learning model executing on the server computing device, to split the unstructured text into one or more phrases, each phrase comprising a plurality of words. The instructions are operable to cause the server computing device to generate a set of tokens from each phrase, where each token comprises a word. The instructions are operable to cause the server computing device to identify one or more tokens in each set of tokens that are stopwords and remove the stopwords from the set of tokens. The instructions are operable to cause the server computing device to determine, for each set of tokens, a number of tokens in the set of tokens. The instructions are operable to cause the server computing device to determine, for each set of tokens, a sentiment score for each token in the set of tokens. The instructions are operable to cause the server computing device to identify, for each set of tokens, one or more tokens in the set of tokens as competitor name tokens. The instructions are operable to cause the server computing device to identify, for each set of tokens, one or more tokens in the set of tokens as complaint tokens based upon the sentiment score for that token. The instructions are operable to cause the server computing device to generate, for each set of tokens, a normalized sentiment score for the set of tokens based upon the sentiment score for each token in the set. The instructions are operable to cause the rules-based classification engine executing on the server computing device to generate, for each set of tokens, a rules-based complaint score for the set of tokens based upon the a) number of tokens in the set of tokens, b) the identified competitor names in the set of tokens, and c) the identified complaint tokens in the set of tokens. The instructions are operable to cause the artificial intelligence machine learning model executing on the server computing device to generate, for each set of tokens, a model-based complaint score for the set of tokens, the artificial intelligence machine learning model generated by the server computing device by creating a word vector for each token from the unstructured text and inserting the word vector in a high-dimensional space, wherein a position of each word vector in the high-dimensional space is based upon a semantic relationship between the corresponding token and surrounding tokens in the unstructured text. The instructions are operable to cause the server computing device to determine, for each set of tokens, whether the set of tokens corresponds to a complaint-specific interaction based upon the rules-based complaint score and the model-based complaint score.

Any of the above aspects can include one or more of the following features. In some embodiments, the artificial intelligence machine learning model positions each word vector in the high-dimensional space to be in proximity to similar word vectors. In some embodiments, the server computing device splits the unstructured text into one or more phrases by locating a terminator in the unstructured text and separating the unstructured text on either side of the terminator into a phrase. In some embodiments, the high-dimensional space comprises hundreds of dimensions.

In some embodiments, the artificial intelligence machine learning model uses a machine-learning text classifier to generate the model-based complaint score for the set of tokens. In some embodiments, the machine-learning text classifier uses one or more of logistic regression techniques, support vector machine techniques, and decision tree techniques.

In some embodiments, the server computing device identifies one or more tokens in the set of tokens as competitor name tokens by comparing each token in the set of tokens against a list of competitor names stored in a database coupled to the server computing device. In some embodiments, the server computing device uses a sentiment lexicon module executing on the server computing device to determine the sentiment score for a token in the set of tokens.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
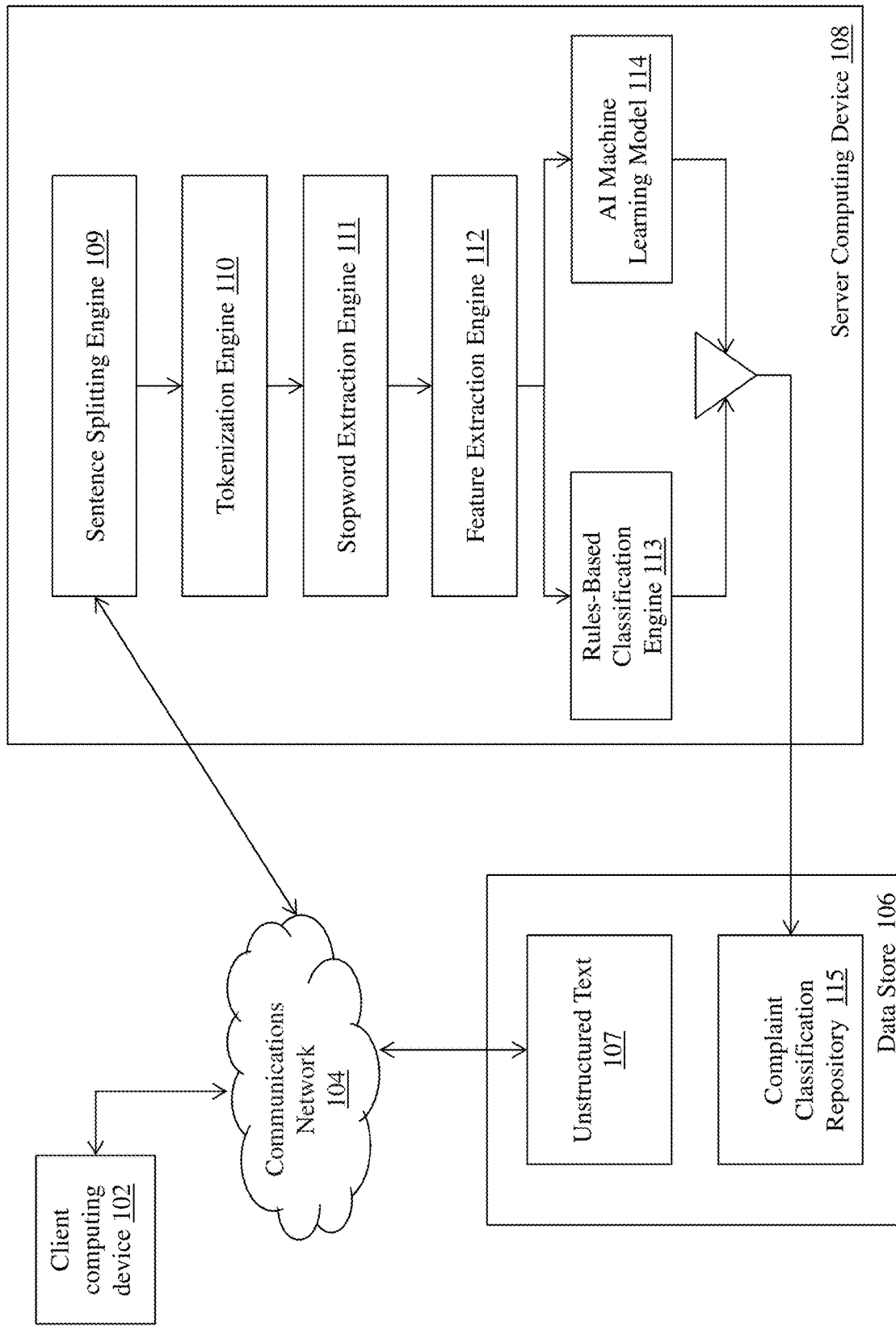
FIG. 1 is a block diagram of a system used in a computing environment in which unstructured computer text is analyzed for identification and classification of complaint-specific interactions.

FIG. 1 is a block diagram of a system 100 used in a computing environment in which unstructured computer text is analyzed for identification and classification of complaint-specific interactions. The system 100 includes a client computing device 102, a communications network 104, a data store 106 with unstructured computer text 107 and a complaint classification repository 115, and a server computing device 108 having a processor that executes a sentence splitting engine 109, a tokenization engine 110, a stopword extraction engine 111, a feature extraction engine 112, a rules-based classification engine 113, and an artificial intelligence (AI) machine learning model 114.

The client computing device 102 connects to the communications network 104 in order to communicate with the server computing device 106 to provide input and receive output relating to the process of analyzing unstructured computer text for identification and classification of complaint-specific interactions as described herein. For example, client computing device 102 can provide a detailed graphical user interface (GUI) that presents output resulting from the analysis methods and systems described herein, where the GUI is utilized by an operator to review and/or modify a set of complaint-specific interactions as generated and evaluated by the system 100.

Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client device 102, it should be appreciated that the system 100 can include any number of client devices. And as mentioned above, in some embodiments the client device 102 also includes a display for receiving data from the server computing device 108 and/or the data store 106 and displaying the data to a user of the client device 102.

The communication network 104 enables the other components of the system 100 to communicate with each other in order to perform the process of analyzing unstructured computer text for identification and classification of complaint-specific interactions as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 108 is a combination of hardware, including one or more processors and one or more physical memory modules, and specialized software engines and models that execute on the processor of the server computing device 108, to receive data from other components of the system 100, transmit data to other components of the system 100, and perform functions for analyzing unstructured computer text for identification and classification of complaint-specific interactions as described herein. As mentioned above, the processor of the server computing device 106 executes a sentence splitting engine 109, a tokenization engine 110, a stopword extraction engine 111, a feature extraction engine 112, a rules-based classification engine 113, and an artificial intelligence (AI) machine learning model 114.

In some embodiments, the engines 109-113 and model 114 are specialized sets of computer software instructions programmed onto a dedicated processor in the server computing device 108 and can include specifically-designated memory locations and/or registers for executing the specialized computer software instructions. Also, the artificial intelligence (AI) machine learning model 114 further includes specialized artificial intelligence processing functionality performed solely by computing devices for specific programming functions. Further explanation of the specific processing performed by the engines 109-113 and the model 114 will be provided below.

The data store 106 is a computing device (or in some embodiments, a set of computing devices) that is coupled to the server computing device 108 and is configured to receive, generate, and store specific segments of data relating to the process of analyzing unstructured computer text for identification and classification of complaint-specific interactions as described herein. In some embodiments, all or a portion of the data store 106 can be integrated with the server computing device 108 or be located on a separate computing device or devices. For example, the data store 106 can comprise one or more databases, such as MySQL™ available from Oracle Corp. of Redwood City, Calif. The data store 106 includes unstructured computer text 107 and a complaint classification repository 114.

The unstructured text 107 is received and stored by the data store 106 via input from a web site/web page, or the unstructured text 107 is received and stored directly into the data store 106 by utilizing a first computer file (e.g., XML, CSV, TXT). For example, a user at client computing device 102 can utilize a GUI provided by the client computing device 102 to select and/or input the unstructured computer text (e.g. directly and/or as a computer file) and transmit the text to the data store 106. In another example, the data store 106 can retrieve the unstructured text from one or more repositories and/or computing systems (e.g., as a data feed and/or a file), such as customer relationship management systems, customer/employee feedback or survey systems, social media systems, human resources systems, and so forth.

The complaint classification repository 114 is generated via the processing of the engines 109-113 and the model 114 on the unstructured computer text 107, as will be described in greater detail below. The complaint classification repository 114 represents a list of interactions extracted from the unstructured computer text via processing of the engines 109-113 and the model 114 that are determined to be complaint-specific interactions. The data in the complaint classification repository 114 can be mined and analyzed to determine the scope and extent of complaint interactions and to subsequently identify complaint-specific interactions from additional unstructured computer text that is received into the system 100.

Figure 2A:
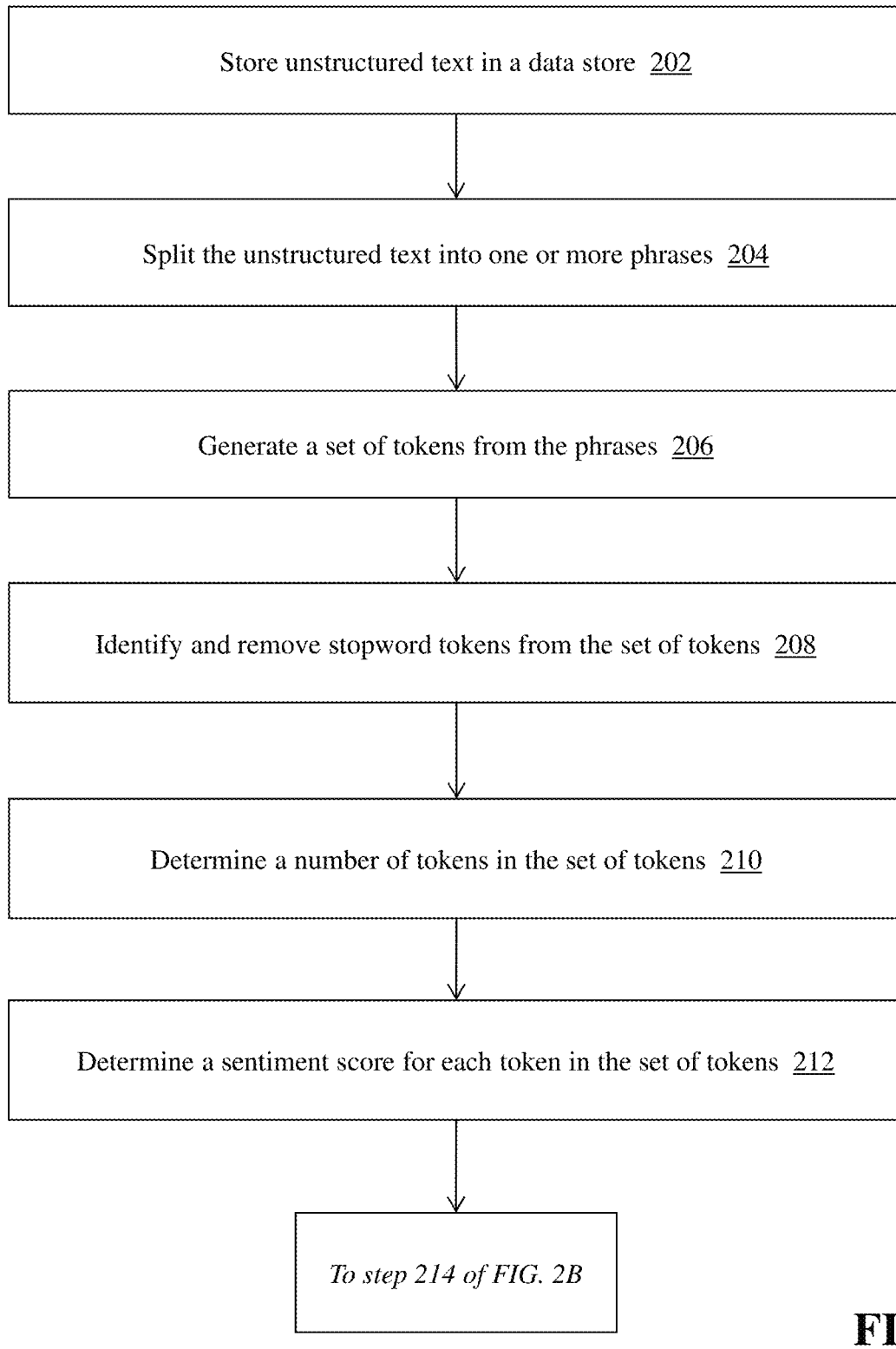
FIGS. 2A and 2B comprise a flow diagram of a method in which unstructured computer text is analyzed for identification and classification of complaint-specific interactions.
Figure 2B:
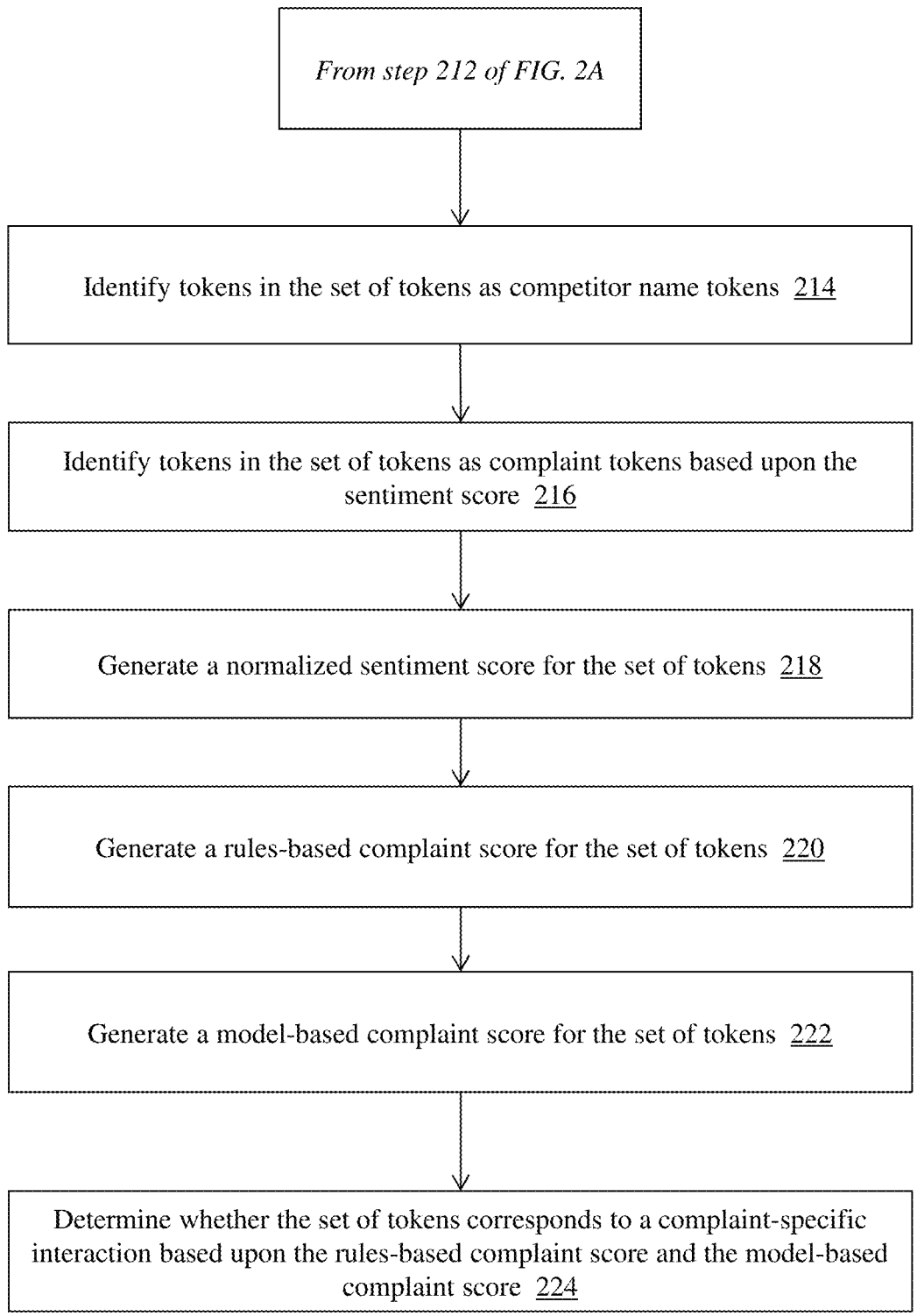

FIGS. 2A and 2B comprise a flow diagram of a method in which unstructured computer text is analyzed for identification and classification of complaint-specific interactions, using the system 100 of FIG. 1. The data store 106 stores (202) unstructured computer text 107 that is input to the data store 106 in a number of different ways—such as via a web page, via a computer file, or a combination of both.

In one example, the unstructured computer text can comprise data derived from a variety of sources, including but not limited to voice-to-text transcripts (e.g., of customer service calls), customer service representative notes (e.g., entered by the representative into a terminal during a customer interaction), verbatims for survey responses or other similar types of feedback, chat transcripts from online interactions, and so forth. In some embodiments, the unstructured computer text can include other elements such as a unique set of phrases from all phrases that are searched on one or more specified websites (e.g., URLs) for a specified duration, and/or a unique set of phrases from all phrases that are associated with one or more specified websites identified by URLs for a specified duration.

One example of a portion of unstructured computer text received by the system 100 is:

"I called the telephone number for the account executive but ended up with a generic customer service line. Then I used the online chat service, but it was very bad. I explained the problem and was given the run-around. They finally told me to call another number."

In some embodiments, the unstructured text can be delimited, meaning that each word or phrase is separated by a specific delimiter or set of delimiters (e.g., an asterisk or a semi-colon) in order for the system 100 to quickly and efficiently segment the entire corpus of unstructured computer text into individual segments. It should be appreciated that, based upon the content of the unstructured text, the system 100 can use a delimiter that is unique or does not regularly appear in the unstructured text to ensure that the unstructured text is not erroneously parsed. Upon receiving the unstructured computer text from the various sources, the data store 106 stores (202) the text for retrieval and use by the server computing device 108 as described below.

First, the sentence splitting engine 109 of the server computing device 108 retrieves all or a portion of the unstructured computer text 107 from the data store 106 and splits (204) the unstructured text into one or more phrases. In some embodiments, the sentence splitting engine 109 utilizes logic to locate a terminator within each line of unstructured text and split the line of text into multiple phrases at each terminator. Using the example unstructured text provided above, the engine 109 receives the corpus of text: "I called the telephone number for the account executive but ended up with a generic customer service line. Then I used the online chat service, but it was very bad. I explained the problem and was given the run around. They finally told me to call another number." The engine 109 locates the period after the word "line" in the first sentence and determines that the period is a terminator—meaning that a specific thought or concept has completed. The engine 109 splits the verbatim into four phrases, namely "I called the telephone number for the account executive but ended up with a generic customer service line," "Then I used the online chat service, but it was very bad," "I explained the problem and was given the run around," and "They finally told me to call another number." Other types of terminators can include but are not limited to conjunctions or prepositions that serve to break up a sentence (e.g., "while," "but"), particularly dual-toned verbatims that have two different tonalities.

Next, the tokenization engine 110 receives the phrases from the sentence splitting engine 109 and generates (206) tokens from the phrases—where each token comprises a word in the overall phrase. In one embodiment, a token is a segment of the line of unstructured computer text that is separated by one or more spaces. For example, the engine 110 breaks the phrase "I called the telephone number for the account executive but ended up with a generic customer service line" down into the following tokens: "I" "called" "the" "telephone" "number" "for" "the" "account executive" "but" "ended" "up" "with" "a" "generic" "customer" "service" "line." It should be appreciated that the tokens which make up a single phrase can logically be considered a set of tokens for the purposes of this disclosure. In some embodiments, the tokens are stored in the data store 106 as being associated with the phrase of unstructured computer text.

As can be appreciated, a token is a fundamental unit that a text processing system typically works with. By generating tokens and sets of tokens from the unstructured text, the system 100 can apply sophisticated computer-based algorithms, e.g., to identify the part-of-speech of each token, form trigrams that are used for other modules like sentiment mining, clustering, and so forth.

The tokenization engine 110 then distributes the sets of tokens to the stopword extraction engine 111. The unstructured computer text obtained by the system 100 contains stopwords, which are generally common and/or context-specific words in a given language. These stopwords are considered as 'noise' in unstructured computer text, add little value to analytics, and need to be removed in order to improve the quality of the unstructured computer text from the perspective of understanding critical aspects of the text content—such as sentiment, intent, and the like—in downstream applications. Examples of stopwords identified by the system 100 are first names (e.g., "Barbara," "David," "Alison"), entity-specific acronyms or strings (e.g., ID numbers), or generic, frequently-used words, such as 'the,' 'and,' 'a' and the like. The stopword extraction engine 111 identifies and removes (208) the tokens that are stopwords in the sets of tokens. In one embodiment, the stopword extraction engine 111 compares the tokens against a stopword dictionary or other reference source to determine whether the tokens are stopwords. Other techniques to remove stopwords can be used with the systems and methods described herein. Using the above example text, the stopword extraction engine 111 identifies and removes stopwords to result in the following reduced set of tokens:

| Set of Tokens | "I called telephone number account executive but ended up generic customer service line"<br>"I used online chat service but very bad"<br>"I explained problem given run-around"<br>"They told me call another number" |
|---|---|

As can be appreciated, the stopword extraction engine 111 removed generic tokens such as "the," "and," "for," "was" and the like.

The stopword extraction engine 111 then transmits the reduced set of tokens to the feature extraction engine 112. The feature extraction engine 112 analyzes the reduced set of tokens to determine certain attributes and characteristics of the tokens within the set. The feature extraction engine 112 first determines (210) a number (or count) of tokens in the set of tokens. Using the above example, the feature extraction engine 112 determines that the set of tokens contains thirty-two tokens.

Next, the feature extraction engine 112 determines (212) a sentiment score for each token in the set of tokens. The sentiment score is a numeric value assigned to each token that represents the positive or negative nature of the sentiment ascribed to the token. Tokens that are associated with a positive sentiment are assigned a positive value (e.g., >0). Tokens that are associated with a negative sentiment are assigned a negative value (e.g., <0). Tokens that are sentiment-neutral are assigned a zero value. In some embodiments, the feature extraction engine 112 uses a sentiment lexicon module executing on the server computing device to determine the sentiment score for each token in the set of tokens. An exemplary sentiment lexicon module for use with the system is SentiWordNet 3.0, a software module available from http://sentiwordnet.isti.cnr.it.

Continuing with the example provided above, the feature extraction engine 112 assigns sentiment values to each token in the set of tokens, a portion of which are as follows:

| Token | Sentiment Value |
|---|---|
| I | 0 |
| called | 0.2 |
| telephone | 0.2 |
| number | 0.3 |
| account | 0 |
| executive | 0 |
| but | −0.8 |
| ended | −0.7 |
| up | −0.2 |
| generic | 0.3 |
| customer | 0.2 |
| service | 0.2 |
| line | 0 |
| . . . | . . . |

The feature extraction engine 112 then identifies (214) tokens in the set of tokens that correspond to competitor names. For example, a set of tokens may include one or more tokens that correspond to entity names or other indicia of competitors to an entity that is processing the unstructured computer text as described herein. If a customer submits an interaction that identifies the name of a competitor, the interaction can potentially be associated with a complaint. The feature extraction module 112 identifies these tokens for the purpose of generating a normalized sentiment score as described below.

The feature extraction engine 112 also identifies (216) tokens in the set of tokens as complaint tokens based upon the sentiment score previously assigned to the tokens. In one embodiment, certain tokens may have a sentiment score that falls below a predetermined threshold—thereby indicating that the tokens are associated with a complaint. Using the above example, the sentiment score threshold for identifying complaint tokens may be set by the feature extraction module 112 at −0.5. The tokens "but" and "ended" each falls below the threshold, and the feature extraction module 112 flags those tokens as complaint tokens, to be used in the generation of normalized sentiment score as described below.

Once the feature extraction engine 112 has a) determined the number of tokens in the set of tokens, b) identified any tokens that are competitor name tokens, and c) identified any tokens that are complaint tokens, the feature extraction engine 112 generates (218) a normalized sentiment score for the set of tokens. In one embodiment, the feature extraction engine 112 adds up the individual sentiment scores for each of the tokens to arrive at an aggregate sentiment score for the set of tokens and uses the aggregate score as the normalized score. In another embodiment, the feature extraction engine 112 adjusts or weights the aggregate sentiment score based upon the presence of any competitor name tokens and/or complaint tokens in the set of tokens. In one embodiment, the aggregate sentiment score is adjusted through normalization using min-max normalization, where the original scores are assigned a value between 0 and 1. The normalization technique enables the system to directly compare scores from different units for sentiment, competitor names, complaint phrases and so forth. In another embodiment, the aggregate sentiment score can be normalized using a z-scores technique.

Next, the feature extraction engine 112 transmits the set of tokens and the corresponding attributes (e.g., number of tokens in the set, individual sentiment scores, normalized sentiment score, identity of competitor name tokens, identity of complaint tokens) to each of the rules-based classification engine 113 and the AI machine learning model 114 that are executed by the server computing device 108. The rules-based classification engine 113 and the AI machine learning model 114 independently analyze each set of tokens to generate a respective classification score for the set of tokens that indicates whether the set of tokens relates to a complaint (or not), and the system 100 then resolves the two classification scores to determine whether the set of tokens should be classified as a complaint. Further detail on the processing provided by the rules-based classification engine 113 and the AI machine learning model 114 is described below.

The rules-based classification engine 113 analyzes the number of tokens in the set, the normalized sentiment score of the set, the identity of competitor name tokens in the set, and the identity of complaint tokens in the set using a series of predefined rules to generate (220) a rules-based complaint score for the set of tokens. In one embodiment, the rules-based classification engine 113 is configured with the following set of rules:

IF [normalized sentiment score]<0 AND [number of complaint tokens]>0 AND [number of competitor name tokens]>0 AND [number of tokens in the set]>30;
THEN [set of tokens] IS complaint;
ELSE [set of tokens] IS NOT complaint.

It should be appreciated that in some embodiments the rules-based complaint score generated by the rules-based classification engine 113 is a binary value (e.g., 0 or 1; true or not true). Other methods and rulesets for generating a rules-based complaint score for the set of tokens can be used without departing from the scope of invention. For example, instead of assigning a binary value of 0 or 1 for the set of tokens to classify them as a complaint or a non-complaint, the engine 113 can assign a final score using the normalization techniques described above. In addition to identifying if an interaction is a complaint, these techniques enable the engine 113 to rank the complaints, which provides for prioritization of the complaints for transmission to various downstream applications.

The AI machine learning module 114 also evaluates each set of tokens and the corresponding attributes to generate (222) a model-based complaint score for the set of tokens.

Either concurrently with processing the sets of tokens, or prior to processing the sets of tokens, the server computing device 108 generates the AI machine learning model 114 by using, e.g., a neural network or other advanced AI processing technique. In one embodiment, the neural network is a shallow, two-layer network that is trained to reconstruct the linguistic context of words (e.g., the tokens produced from the unstructured computer text). The neural network receives the corpus of tokens from the tokenization engine 110, creates a word vector for each token and inserts the word vectors in a high-dimensional space (e.g., several hundred dimensions). The neural network positions the word vectors in the high-dimensional vector space such that tokens that share common contexts in the unstructured computer text are located in close proximity to one another. Exemplary algorithms that can be used in the neural network processing are Word2vec (available from http://deeplearning4j.org/word2vec), Glove (available from http://nlp.stanford.edu/projects/glove) or BSG (described in "Bayesian Neural Word Embedding" by Oren Barkan, Tel Aviv University, dated Jun. 5, 2016, available from https://arxiv.org/abs/1603.06571 which is incorporated herein by reference).

Once the neural network completes its processing of the corpus of tokens and generates the AI machine learning model 114, the server computing device 108 executes the AI machine learning model 114 against the sets of tokens received from the feature extraction engine 112 to generate the model-based complaint score. Exemplary techniques used by the AI machine learning model 114 include, but are not limited to, logistic regression techniques, support vector machine (SVM) techniques, and decision tree techniques. An exemplary SVM module is described at http://scikit-learn.org/stable/modules/svm.html. An exemplary logistic regression module is described at http://scikit-learn.org/stable/modules/generated/sklearn.linear_model.LogisticRegression.html. An exemplary decision tree module is described at http://scikit-learn.org/stable/modules/tree.html. In one embodiment, the model-based complaint score are real numbers similar to what is produced by the rules-based engine 113.

Once the rules-based classification engine 113 and the AI machine learning model 114 each generates its respective complaint score for the set of tokens, the server computing device 108 determines (224) whether the set of tokens corresponds to a complaint-specific interaction based upon the rules-based complaint score and the model-based complaint score. In one embodiment, the rules-based classification engine 113 may assign a complaint score of zero to a set of tokens (indicating that the set of tokens is not a complaint)—while the AI machine learning model 114 returns a complaint score that indicates the set of tokens is a complaint. The server computing device 108 can resolve this conflict in a number of ways. In one example, the server computing device 108 can automatically select the complaint score provided by the AI machine learning model 114 based upon its advanced algorithmic techniques as in some cases, it may be possible for the rules-based classification engine 113 to incorrectly identify sets of tokens as complaints or as non-complaints—especially if the rules configured in the engine 113 are not adjusted to account for emerging changes in sentiment values or misidentification of complaint tokens or competitor names.

Depending on the downstream application, the server computing device 108 can provide more weight to the score produced by the rules-based classification engine 113 or the AI machine learning model 114. For the rules-based classification engine 113, an advantage is that the complaint score is easily explainable. However, for the AI machine learning model 114, the complaint score is based on complex interactions that are not easily explainable to an end user. Therefore, if the end user wants to understand how scores were obtained when acting on a complaint, the server computing device 108 can be configured to give more weight to the score produced by the rules-based classification engine 113.

Once the server computing device 108 has determined whether the set of tokens corresponds to a complaint-specific interaction or not, the server computing device 108 transmits the classified set of tokens to the complaint classification repository 115. The classified set of tokens is stored in the repository 115 and can be used by, e.g., the rules-based classification engine 113 and/or the AI machine learning model 114 during evaluation of subsequent sets of tokens in order to realize a more accurate classification of later-received unstructured computer text.

Furthermore, the systems and methods described herein provide a number of distinct technical advantages over prior computerized text classification systems. The use of advanced artificial intelligence techniques as described above leverage the processing capability of computer processors to analyze the sets of tokens in a high-dimensional word vector space—which is specific to computer data processing and is not achievable via manual methods. In addition, the automatic classification of complaint-specific interactions from a large corpus of unstructured computer text results in fewer text requiring review via manual methods—leading to processing efficiency and greater accuracy.

In one example, the system 100 can automatically transmit the output from its analysis to the computing systems operated by customer care representatives, who can then call up the customers to address their complaints. In some cases, customer information can be used in conjunction with the complaint score to come up with a ranked list of complaints. For example, the ranking can be based on the customer's value to the company using net worth, relationship with the company, and so forth.

In another example, the system 100 can automatically generate a list of top "issues" that a particular customer encounters, or that all customers encounter. Using information extraction techniques on these complaints, the system 100 identifies the type of complaints or issues that customers face based on, e.g., the number of times customers are complaining about a particular topic. For example, "usability of mobile app" can be a potential issue. Once the system 100 isolates and identifies the most important and/or frequently-raised issues, the system can transmit automated notifications to an appropriate team to fix the issue.

Method steps can be performed by one or more special-purpose processors executing a computer program to perform functions of the invention by operating on input data and/or generating output data. Method steps can also be performed by, and an apparatus can be implemented as, special-purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose microprocessors. Generally, a processor receives instructions and data from a read-only memory or a random access memory or both. The essential elements of a computer are a specialized processor for executing instructions and one or more specifically-allocated memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system used in a computing environment in which unstructured computer text is analyzed for identification and classification of complaint-specific interactions, the system comprising: a computer data store including unstructured text, the unstructured text being input via a web page and input directly into the computer data store via a first computer file, and a server computing device in communication with the computer data store and programmed to: split the unstructured text into one or more phrases, each phrase comprising a plurality of words; generate a set of tokens from each phrase, wherein each token comprises a word; for the set of tokens from each phrase: identify one or more tokens in the set of tokens as stopword tokens and remove the stopword tokens from the set of tokens; determine a number of tokens in the set of tokens; determine a sentiment score for each token in the set of tokens; identify one or more tokens in the set of tokens as competitor name tokens;

identify one or more tokens in the set of tokens as complaint tokens based upon the sentiment score for that token; generate a normalized sentiment score for the set of tokens based upon the sentiment score for each token in the set; generate, using a rules-based classification engine executing on the server computing device, a rules-based complaint score for the set of tokens based upon the a) number of tokens in the set of tokens, b) the identified competitor names in the set of tokens, and c) the identified complaint tokens in the set of tokens; generate, using an artificial intelligence machine learning model executing on the server computing device, a model-based complaint score for the set of tokens, the artificial intelligence machine learning model generated by the server computing device by creating a word vector for each token from the unstructured text and inserting the word vector in a high-dimensional space, wherein a position of each word vector in the high-dimensional space is based upon a semantic relationship between a corresponding token and surrounding tokens in the unstructured text; and determine whether the set of tokens corresponds to a complaint-specific interaction based upon the rules-based complaint score and the model-based complaint score.

2. The system of claim 1, wherein the artificial intelligence machine learning model positions each word vector in the high-dimensional space to be in proximity to similar word vectors.

3. The system of claim 1, wherein the server computing device splits the unstructured text into one or more phrases by locating a terminator in the unstructured text and separating the unstructured text on either side of the terminator into a phrase.

4. The system of claim 1, wherein the high-dimensional space comprises hundreds of dimensions.

5. The system of claim 1, wherein the artificial intelligence machine learning model uses a machine-learning text classifier to generate the model-based complaint score for the set of tokens.

6. The system of claim 5, wherein the machine-learning text classifier uses one or more of logistic regression techniques, support vector machine techniques, and decision tree techniques.

7. The system of claim 1, wherein the server computing device identifies one or more tokens in the set of tokens as competitor name tokens by comparing each token in the set of tokens against a list of competitor names stored in a database coupled to the server computing device.

8. The system of claim 1, wherein the server computing device uses a sentiment lexicon module executing on the server computing device to determine the sentiment score for a token in the set of tokens.

9. A computerized method in which unstructured computer text is analyzed for identification and classification of complaint-specific interactions, the method comprising: storing, in a computer data store, unstructured text, the unstructured text being input via a web page and input directly into the computer data store via a first computer file; splitting, by a server computing device in communication with the computer data store, the unstructured text into one or more phrases, each phrase comprising a plurality of words; generating, by the server computing device, a set of tokens from each phrase, wherein each token comprises a word; for the set of tokens from each phrase: identifying, by the server computing device, one or more tokens in the set of tokens that are stopword tokens and remove the stopword tokens from the set of tokens; determining, by the server computing device, a number of tokens in the set of tokens; determining, by the server computing device, a sentiment score for each token in the set of tokens; identifying, by the server computing device, one or more tokens in the set of tokens as competitor name tokens; identifying, by the server computing device, one or more tokens in the set of tokens as complaint tokens based upon the sentiment score for that token; generating, by the server computing device, a normalized sentiment score for the set of tokens based upon the sentiment score for each token in the set; generating, using a rules-based classification engine executing on the server computing device, a rules-based complaint score for the set of tokens based upon the a) number of tokens in the set of tokens, b) the identified competitor names in the set of tokens, and c) the identified complaint tokens in the set of tokens; generating, using an artificial intelligence machine learning model executing on the server computing device, a model-based complaint score for the set of tokens, the artificial intelligence machine learning model generated by the server computing device by creating a word vector for each token from the unstructured text and inserting the word vector in a high-dimensional space, wherein a position of each word vector in the high-dimensional space is based upon a semantic relationship between a corresponding token and surrounding tokens in the unstructured text; and determining, by the server computing device, whether the set of tokens corresponds to a complaint-specific interaction based upon the rules-based complaint score and the model-based complaint score.

10. The method of claim 9, wherein the artificial intelligence machine learning model positions each word vector in the high-dimensional space to be in proximity to similar word vectors.

11. The method of claim 9, wherein the server computing device splits the unstructured text into one or more phrases by locating a terminator in the unstructured text and separating the unstructured text on either side of the terminator into a phrase.

12. The method of claim 9, wherein the high-dimensional space comprises hundreds of dimensions.

13. The method of claim 9, wherein the artificial intelligence machine learning model uses a machine-learning text classifier to generate the model-based complaint score for the set of tokens.

14. The method of claim 13, wherein the machine-learning text classifier uses one or more of logistic regression techniques, support vector machine techniques, and decision tree techniques.

15. The method of claim 9, wherein the server computing device identifies one or more tokens in the set of tokens as competitor name tokens by comparing each token in the set of tokens against a list of competitor names stored in a database coupled to the server computing device.

16. The method of claim 9, wherein the server computing device uses a sentiment lexicon module executing on the server computing device to determine the sentiment score for a token in the set of tokens.

17. A non-transitory computer readable storage medium comprising programmatic instructions for operation of a computing environment in which unstructured computer text is analyzed for identification and classification of complaint-specific interactions, the instructions operable to cause a computer data store to store unstructured text, the unstructured text being input via a web page and input directly into the computer data store via a first computer file; and a server computing device in communication with the computer data store, and including an rules-based classification engine and an artificial intelligence machine learning model executing on the server computing device, to: split the unstructured text into one or more phrases, each phrase comprising a plurality of words; generate a set of tokens from each phrase, wherein each token comprises a word; for the set of tokens from each phrase: identify one or more tokens in the set of tokens that are stopword tokens and remove the stopword tokens from the set of tokens; determine a number of tokens in the set of tokens; determine a sentiment score for each token in the set of tokens; identify one or more tokens in the set of tokens as competitor name tokens; identify one or more tokens in the set of tokens as complaint tokens based upon the sentiment score for that token; generate a normalized sentiment score for the set of tokens based upon the sentiment score for each token in the set; generate, using the rules-based classification engine, a rules-based complaint score for the set of tokens based upon the a) number of tokens in the set of tokens, b) the identified competitor names in the set of tokens, and c) the identified complaint tokens in the set of tokens; generate, using the artificial intelligence machine learning model, a model-based complaint score for the set of tokens, the artificial intelligence machine learning model generated by the server computing device by creating a word vector for each token from the unstructured text and inserting the word vector in a high-dimensional space, wherein a position of each word vector in the high-dimensional space is based upon a semantic relationship between a corresponding token and surrounding tokens in the unstructured text; and determine whether the set of tokens corresponds to a complaint-specific interaction based upon the rules-based complaint score and the model-based complaint score.

* * * * *